United States Patent [19]
Sauer

[11] 4,116,139

[45] Sep. 26, 1978

[54] COLD FLOW LIQUID VAPOR SHOE

[75] Inventor: Clement J. Sauer, Evansville, Ind.

[73] Assignee: Chem-Farm Inc., Evansville, Ind.

[21] Appl. No.: 798,573

[22] Filed: May 19, 1977

[51] Int. Cl.² ............................................. A01C 23/02
[52] U.S. Cl. ............................................. 111/7; 111/73;
111/80; 111/86
[58] Field of Search .................... 111/6, 7, 86, 73, 80,
111/85, 7.1, 7.2, 7.3, 7.4; 172/699, 702, 705,
707, 708, 713; 62/51

[56] References Cited

U.S. PATENT DOCUMENTS

| | | | |
|---|---|---|---|
| 1,777,391 | 10/1930 | Brewer | 111/7 |
| 2,134,245 | 10/1938 | Carswell | 111/7 X |
| 2,237,775 | 4/1941 | Woods et al. | 111/7 |
| 2,598,121 | 5/1952 | Hannibal | 111/7 |
| 2,905,117 | 9/1959 | Dugan | 111/7 |
| 3,326,152 | 6/1967 | Frantzen | 111/7 |
| 3,610,184 | 10/1971 | Carroll | 111/7 |
| 3,854,429 | 12/1974 | Blair | 111/7 |
| 3,978,681 | 9/1976 | Kjelgaard et al. | 62/51 |

*Primary Examiner*—Edgar S. Burr
*Assistant Examiner*—James R. Feyrer
*Attorney, Agent, or Firm*—Olson, Trexler, Wolters, Bushnell & Fosse, Ltd.

[57] ABSTRACT

A chisel plow and a cold flow shoe for dispensing ammonia fertilizer into an earthen field are disclosed. The shoe includes a vapor tube for receiving ammonia vapor, and a liquid tube for receiving ammonia liquid from sources which can be mounted upon the plow. The vapor tube defines an orifice for dispensing the received ammonia vapor in a rearward direction into a trench formed by the plow chisel. The liquid tube defines a liquid dispenser orifice located immediately above and to the rear of the vapor dispensing orifice. Liquid ammonia is thus dispensed atop the previously dispensed ammonia vapor as the plow chisel moves through the ground and forms the trench. As earth collapses atop the dispensed ammonia, the ammonia is retained in positions located immediately adjacent growing crop plants, or adjacent those locations where plants will be grown. Effective, efficient ammonia fertilization is thus provided.

14 Claims, 4 Drawing Figures

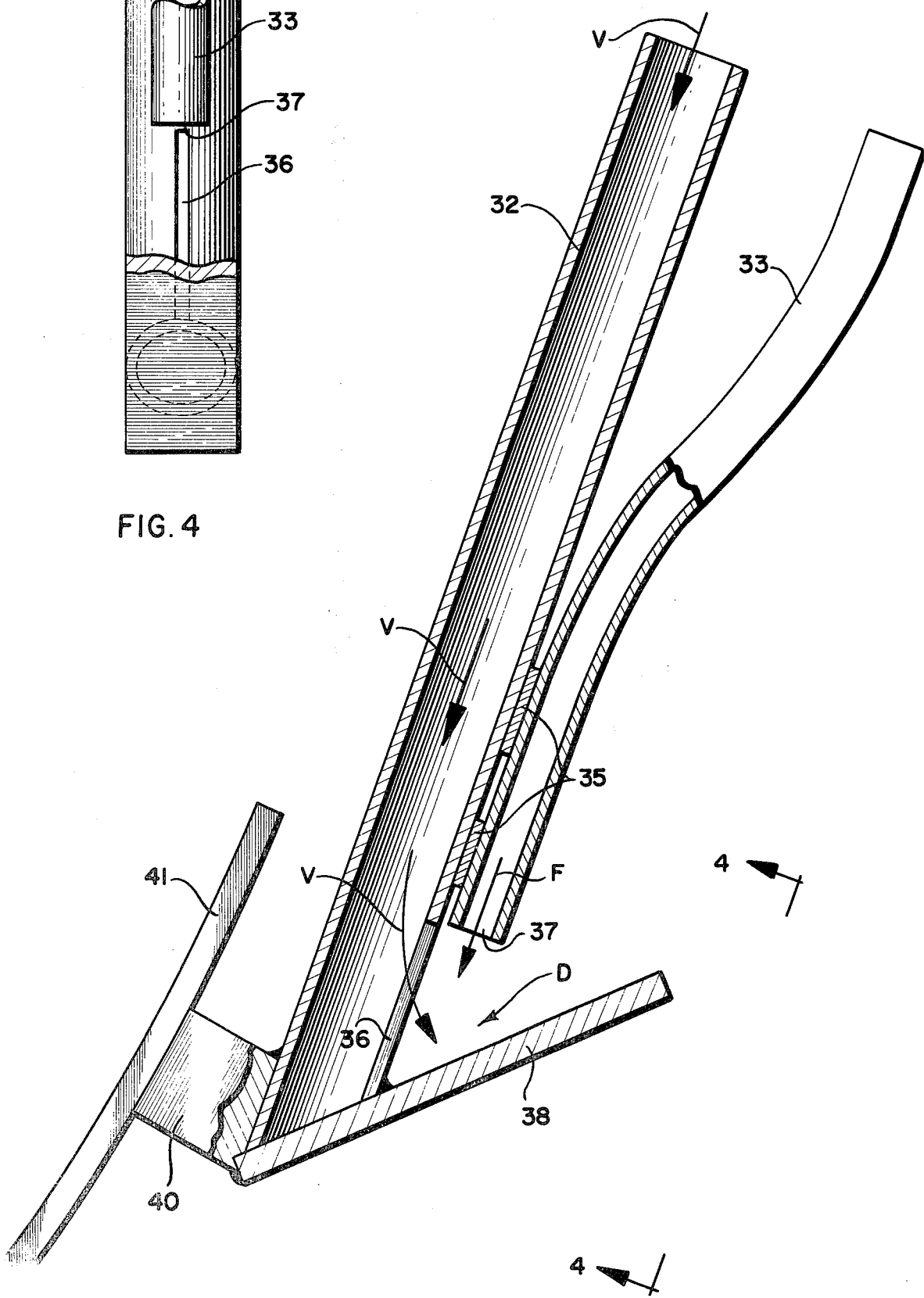

COLD FLOW LIQUID VAPOR SHOE

BACKGROUND OF THE INVENTION

This invention relates generally to earthworking and fluid fertilizer distribution apparatus, and more particularly concerns apparatus for distributing liquid fertilizer such as ammonia in conjunction with a plow apparatus of the chisel type.

Anhydrous ammonia is widely used as an agricultural fertilizer. Under common methods of ammonia field fertilization, a farmer receives his anhydrous ammonia in a tank which is so pressurized as to maintain the ammonia in a liquid state. As the farmer plows or otherwise works his field, the material is distributed to various outlet nozzles adjacent earthworking tool elements. In many such methods, this ammonia is then discharged directly into the ground in a vaporous state. Copending U.S. application Ser. No. 758,588 filed Jan. 12, 1977 discloses apparatus which quickly covers the discharged ammonia with field earth, so as to minimize ammonia escape and consequently enhance the ammonia fertilizing effect.

Another system of ammonia fertilization calls for the routing of liquid ammonia through a pressure regulator valve to a pressure reduction unit. As the ammonia emerges from the reduction unit, on the order of 85% of the ammonia remains in its liquid state, but about 15% of the ammonia has been transformed into a vaporous state. Apparatus of the type described has been developed by the United States Steel Corporation, 208 South LaSalle Street, Chicago, Ill. 60604.

It is the general object of the present invention to provide field plowing and field fertilizing apparatus which will dispense both ammonia liquid and ammonia vapor in a plowed field trench, and which will accomplish this dispensing action in a way which will encourage retention of the ammonia in the field soil.

A similar object is to provide apparatus for dispensing ammonia fertilizer along a line where crops will be planted, as opposed to dispensing the ammonia indiscriminately throughout the field.

A more specific object is to provide dispensing apparatus which will accommodate the separate input of ammonia liquid and ammonia vapor, and which will dispense these materials in an effective manner.

A further object is to provide apparatus of the type described which is inexpensive to manufacture, yet which is reliable and rugged in operation.

Another object is to provide such dispensing apparatus in which the possibility of earth clogging the ammonia dispenser orifices is minimized.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 3 is a fragmentary elevational view in partial section showing the novel dispensing apparatus in still further detail; and FIG. 4 is a fragmentary sectional development view taken substantially in the plane of line 4—4 in FIG. 3.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Figure 1:
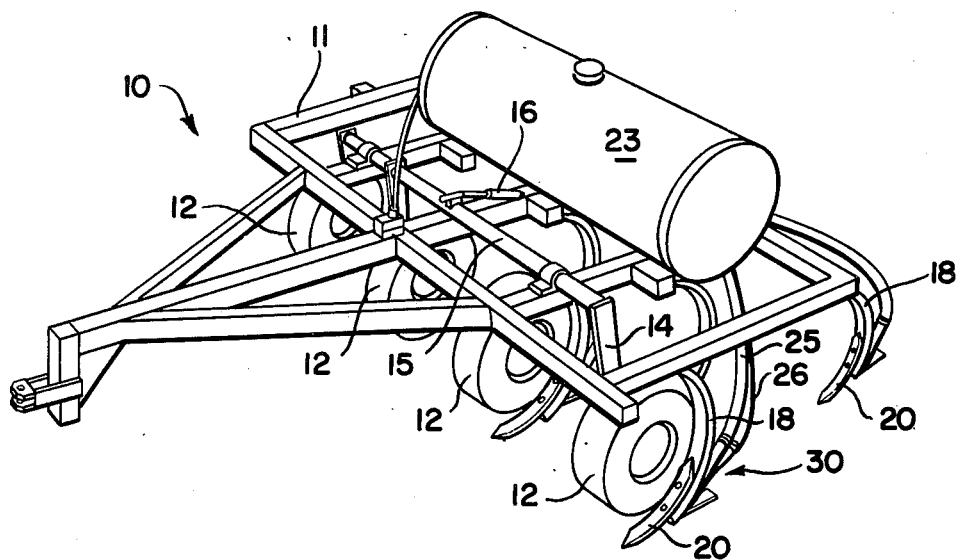
FIG. 1 is a perspective view showing an earthworking implement provided with an embodiment of the present invention.

Turning first to FIG. 1, there is shown an implement 10 for plowing or cultivating a typical agricultural earth field (not shown). The illustrated implement 10 includes a frame 11 adapted to move over the field upon wheels 2. Here, these wheels 12 are mounted upon struts 14 carried upon a rock shaft 15. A hydraulic cylinder 16 is adapted to rotate this rock shaft 15 and, consequently, swing the wheels 12 between generally raised, implement-operational positions and generally lowered, implement-transport positions.

From the frame 11 depend a number of chisel plow shanks 18, and to these shanks 18 are detachably secured chisel blades 20. These blades 20 are provided with points 21 adapted to engaged the field earth or soil and to form relatively narrow individualized trenches as the implement 10 is pulled in given direction over the field. To extend the useful life of the chisel elements 20, additional earthworking points 22 can be provided at the opposite ends of each chisel element 20. When the first point 21 becomes worn or damaged, the chisel element 20 can be detached from the chisel shank 18, reversed it its orientation, and reinstalled on the shank so as to dispose the second, previously unused, chisel point 22 in the working position.

Atop the implement frame 11 is carried a tank 23 in which is retained anhydrous ammonia fertilizer. By means not shown, quantities of ammonia liquid and ammonia vapor are prepared, and are routed to points adjacent but behind the plow chisels 20. Here, ammonia vapor is routed to the dispensing points via clear plastic liquid dispensing lines 25; ammonia liquid is routed to the dispensing points via separate clear plastic flexible conduit lines 26.

In accordance with the invention, the ammonia liquid and the ammonia vapor are separately received at the dispensing position by a novel cold flow shoe 30, and are dispensed by the shoe 30 into the field earth or soil in a manner which encourages the ammonia to be retained within the soil, and to be located at spots adjacent which crop plants will be planted or are growing. To this end, these shoes 30 are attached behind the chisels 20 and their supporting shanks 18. Each shoe includes a vapor tube 32 for receiving ammonia vapor from the vapor hose or line 25, and a liquid tube 33 affixed to the rear of the vapor tube 32 for receiving and dispensing ammonia liquid received from the liquid line 26. Here, the liquid tube 33 is attached to the vapor tube 32 by weldments 35 to ensure rigid, rugged interconnection at relatively low manufacturing cost.

To encourage the received and dispensed ammonia to be retained within the soil, the vapor tube 32 defines a vapor tube orifice 36 formed in the rear of the tube 32. By so locating the vapor tube dispensing orifice 36, the vapor is dispensed rearwardly of the chisel 20 and the tube 32 directly into the trench, as indicated by the arrows V in FIG. 3. Here this dispensing orifice 36 takes the form of an elongated slit as shown in FIG. 4.

It is another feature of the invention that the apparatus is designed to assist in retaining the ammonia within the soil and to inhibit its escape. To this end, the liquid tube 33 is provided with a round bottom orifice 37 formed in the bottom of the vapor 32. This downwardly facing liquid dispensing orifice 37 is located above the vapor dispensing orifice 36, and permits discharge of ammonia liquid in a downward direction as indicated by the arrows F in FIG. 3. By so arraying the dispensing ammonia vapor and liquid ammonia, the liquid ammonia is generally placed atop the ammonia vapor in the dispensing region D. The liquid ammonia can thus act as a fluid blanket to the ammonia vapor, and prevent vapor escape before both the liquid and vaporous ammonia are covered by earth collapsing into the trench. Ammonia retention in the trench is thus encouraged. This relatively quiescent dispensing action and rapid covering activity encourages ammonia diffusion into positions adjacent those where plants are located or will be planted.

To prevent earth at the trench bottom or trench sides from falling into and perhaps clogging the ammonia dispensing orifices 36 and 37, a plate 38 is affixed to the bottom of the vapor tube 32, and it extends rearwardly of both tubes as illustrated in FIG. 3 so as to provide a temporary bottom to the trench which is being filled with ammonia in the dispensing region D. It will also be noted that, by securing the plate 38 to the bottom of the vapor tube 32, an effective plug is inexpensively provided to the vapor tube 32. All vapor is thus dispensed above the plate 38 and to the rear of the vapor tube 32 into the region D.

Figure 2:
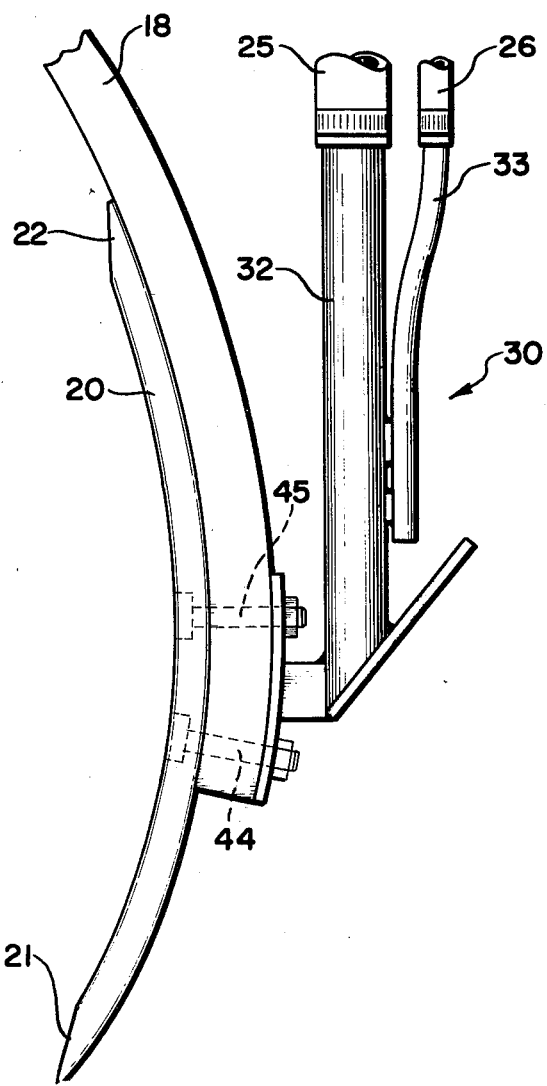
FIG. 2 is a fragmentary elevational view showing the novel dispensing apparatus and associated structure in further detail.

To securely position the cold flow shoe 30 at the desired position behind th chisel 20, an ear member 40 is connected to the vapor tube 32 at its lower end as illustrated in FIG. 3. A bracket plate 41 is, in turn, secured to the ear 40. It is a feature of the invention that the cold flow shoe 30 can be inexpensively and easily attached to the chisel 20 and the chisel shank 18, and to this end, the bracket plate 41 is apertured in a manner which permits the plate 41 to be fitted over bolts 44 and 45 which are used to attach the chisel 20 to chisel shank 18 as illustrated in FIG. 2. Thus, the same fasteners 44 and 45 can be used to attach both the chisel 20 and the shoe 30 to the shank 18, and consequently reduce part inventory and manufacturing costs.

The invention claimed is as follows:

1. A shoe for use with an earth plow having at least one chisel blade mounted upon a chisel shank and adapted to move through field earth so as to create a trench, the shoe comprising means for applying and at least temporarily holding ammonia in the soil, the means including, a vapor tube for receiving ammonia vapor, a vapor tube orifice defined in the vapor tube for dispensing the received ammonia vapor, a liquid tube for receiving ammonia liquid, and a liquid tube orifice defined in the liquid tube and located above and to the rear of the vapor tube orifice for dispensing liquid ammonia in a path that intersects from above the path of discharge of the previously dispensed ammonia vapor as the plow chisel moves through the ground and forms the trench, so as to encourage the liquid ammonia to act as a fluid blanket to the ammonia vapor and to discourage vapor escape from the trench before the liquid and vaporous ammonia are covered by field earth.

2. A shoe according to claim 1 wherein said liquid tube is affixed to the rear of the vapor tube.

3. A shoe according to claim 2 including weldment means affixing said liquid tube to said vapor tube.

4. A shoe according to claim 2 wherein said vapor tube orifice faces rearwardly to dispense the ammonia vapor in a direction adapted for immediate impingement by ammonia liquid, so as to thereby encourage ammonia retention in the trench and earth.

5. A shoe according to claim 1 including ear means connected to said vapor tube to locate the vapor tube at a given position spaced apart behind the plow shank and chisel.

6. A shoe according to claim 5 including bracket plate means affixed to said ear means and adapted to be secured to the plow at a position to the rear of a plow chisel blade.

7. A shoe according to claim 6 wherein the plow chisel blade is adapted to be removably affixed to the chisel shank by blade/shank fasteners located at predetermined positions on the chisel blade and shank, and wherein said bracket plate is provided with apertures aligned to be fitted over the blade/shank fasteners, whereby to permit both the blade and the bracket to be affixed to the shank by the same fasteners.

8. A shoe according to claim 1 including plate means extending rearwardly of the vapor tube and located below the vapor tube orifice to provide a temporary bottom to the trench being formed and by the chisel and filled with ammonia, and to discourage clogging of any orifice with earth.

9. A shoe according to claim 8 wherein said plate extends across the bottom of said vapor tube to close off said vapor tube bottom and ensure that all vapor is dispensed above the plate and to the rear of the vapor tube.

10. A tool for plowing and fertilizing an earthen field, comprising, in combination, a frame adapted to move over the field, at least one chisel shank depending from the frame, a chisel blade detachably secured to the chisel shank for moving through the earth and thereby forming a trench, and a shoe attached behind the blade and shank for dispensing ammonia fertilizer into the chisel trench, the shoe comprising means for applying and at least temporarily holding ammonia in the soil, the means including a vapor tube for receiving ammonia vapor, a vapor tube orifice formed in the rear of the vapor tube for dispensing ammonia vapor rearwardly of the chisel and tube into the trench, an ammonia liquid tube affixed to the rear of the vapor tube, and a liquid tube orifice formed in the bottom of the liquid tube and located above the vapor tube orifice for dispensing liquid ammonia in a path that intersects from above the path of discharge of the dispensed ammonia vapor into the trench to encourage ammonia retention in the trench.

11. A tool according to claim 10 including ear means connected to said vapor tube to locate the vapor tube at a given position spaced apart behind said chisel shank, and bracket plate means affixed to the ear means and adapted to be secured to the rear of the tool chisel and shank.

12. A tool according to claim 11 including blade/shank fasteners extending through both the chisel shank and the chisel blade to affix the blade to the shank, and wherein said bracket plate is provided with apertures aligned to be fitted over the blade/shank fastener, whereby to permit the bracket and shoe to be affixed to the chisel blade and shank by the same fasteners.

13. A tool according to claim 10 including plate means extending rearwardly of said vapor tube and located below said vapor tube orifice to provide a temporary bottom to the trench being formed and filled with ammonia and to discourage clogging of any shoe orifice with earth.

14. A tool according to claim 13 wherein said plate means is affixed to the bottom of said vapor tube to close off said vapor tube bottom and ensure that all vapor is dispensed above the plate and to the rear of said vapor tube.

* * * * *